United States Patent
Fritz et al.

(10) Patent No.: US 9,870,653 B1
(45) Date of Patent: Jan. 16, 2018

(54) VEHICLE AND TRAILER WEIGHT BALANCE AND FORCE INDICATION SYSTEM AND METHOD OF USE

(71) Applicants: Larron Fritz, Fort Worth, TX (US); Eric Mercado, Denton, TX (US)

(72) Inventors: Larron Fritz, Fort Worth, TX (US); Eric Mercado, Denton, TX (US)

( * ) Notice: Subject to any disclaimer, the term of this patent is extended or adjusted under 35 U.S.C. 154(b) by 0 days.

(21) Appl. No.: 15/015,028

(22) Filed: Feb. 3, 2016

(51) Int. Cl.
| | |
|---|---|
| *G01M 17/00* | (2006.01) |
| *G07C 5/08* | (2006.01) |
| *B60D 1/06* | (2006.01) |
| *G07C 5/00* | (2006.01) |
| *G01G 19/08* | (2006.01) |

(52) U.S. Cl.
CPC ............ *G07C 5/0816* (2013.01); *B60D 1/06* (2013.01); *G01G 19/08* (2013.01); *G07C 5/008* (2013.01); *G07C 5/0808* (2013.01)

(58) Field of Classification Search
CPC .... G07C 5/0816; G07C 5/008; G07C 5/0808; B60D 1/06; G01G 19/08; B60L 1/00
USPC .............. 701/34.4, 37, 55, 42; 414/542, 469
See application file for complete search history.

(56) References Cited

U.S. PATENT DOCUMENTS

| | | | |
|---|---|---|---|
| 2002/0145662 A1* | 10/2002 | Mizusawa | B60D 1/36 348/118 |
| 2007/0271017 A1* | 11/2007 | Samie | F16H 61/0213 701/55 |
| 2009/0093928 A1* | 4/2009 | Getman | B60T 8/1755 701/37 |
| 2013/0183126 A1* | 7/2013 | Alexander | B60P 1/5428 414/542 |
| 2013/0253814 A1* | 9/2013 | Wirthlin | G01G 19/02 701/124 |
| 2015/0343937 A1* | 12/2015 | Nespor | B60P 3/122 414/469 |
| 2016/0231165 A1* | 8/2016 | Fredrickson | B60L 1/006 |

* cited by examiner

*Primary Examiner* — Shardul Patel
(74) *Attorney, Agent, or Firm* — Richard G. Eldredge; Eldredge Law Firm

(57) ABSTRACT

A system includes a vehicle having a rear bumper and a trailer hitch assembly having a hitch trailer ball; a trailer having a tongue adapted to engage with the hitch trailer ball and a platform configured to carry a load; and a monitoring system having a computer, a sensor operably associated with the computer and configured to measure a weight of the load carried by the trailer, and an alarm operably associated with the computer and configured to notify a user as a predetermined weight threshold is reached.

14 Claims, 3 Drawing Sheets

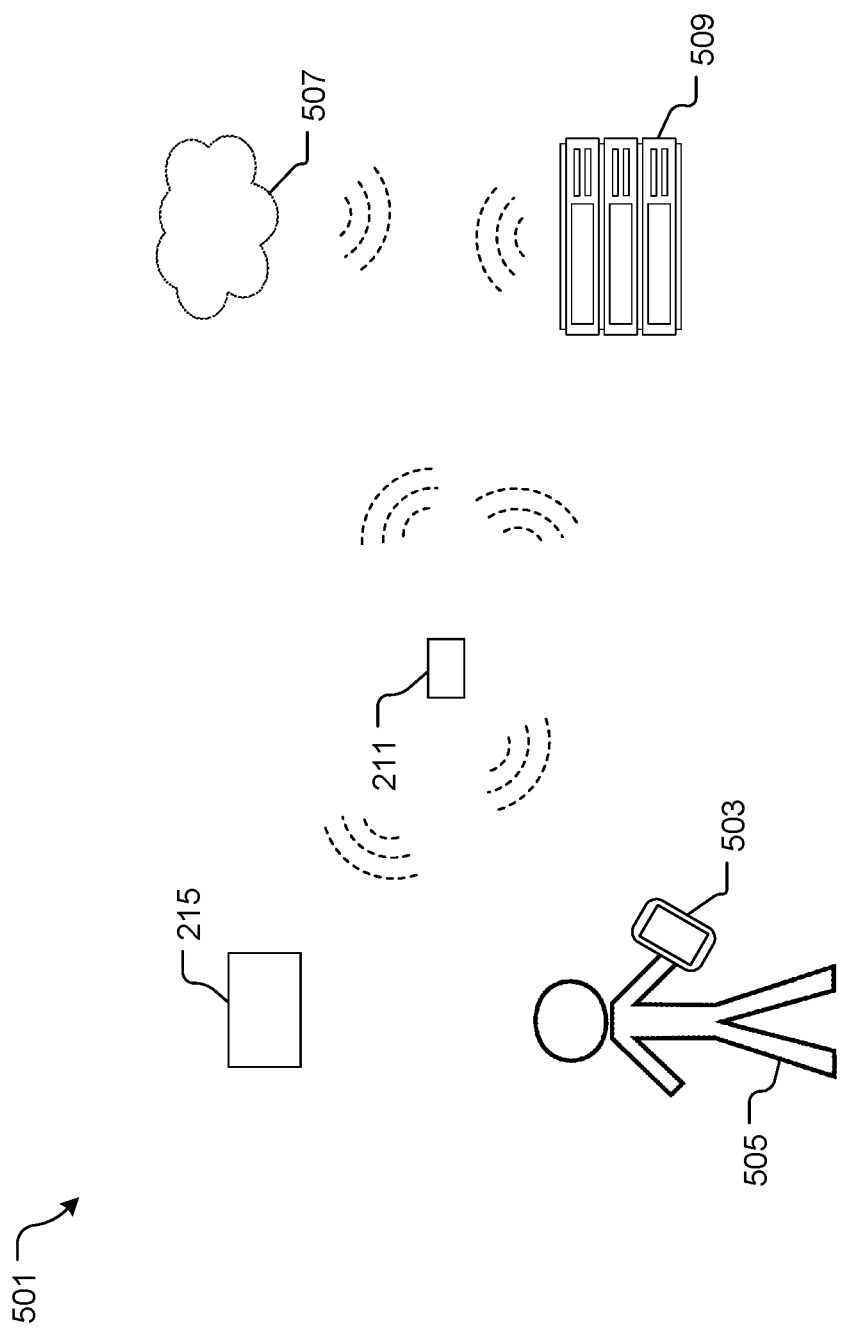

VEHICLE AND TRAILER WEIGHT BALANCE AND FORCE INDICATION SYSTEM AND METHOD OF USE

BACKGROUND

1. Field of the Invention

The present invention relates generally to systems and methods to detect and notify hauling and pulling weight and force, and more specifically the location and resulting magnitude of force from weighted loads that are distributed about a vehicle or trailer.

2. Description of Related Art

The process of process of pulling a utility trailer behind a vehicle is well known in the art and is an effective means to transport a load. For example, FIG. 1 illustrates a simplified side view of a vehicle 101 hauling and towing a load 103 via a trailer 105. In common practice, the hitch ball and/or other receiver hitch assembly 107 is generally secured on or near the rear bumper and/or other rear frame component of the vehicle 101. In some alternative embodiment, the vehicle may transport a trailer via a "fifth wheel" hitch assembly usually located above or near the rear axle of the vehicle. In this embodiment, the trailer accepts a king pin of a gooseneck style of the trailer.

One of the problems commonly associated with the above-described processes to carry and/or tow a load 103 is exceeding the vehicle and/or trailer maximum load capacity at any one or more of its axles, frame, suspension or drivetrain components, which in turn could cause damage to vehicle 101, e.g., damage to the rear bumper or neck of the trailer. Additionally, exceeding the maximum load rating of any component of the vehicle 101 may not cause physical damage to a component of the vehicle 101 or trailer 105, it may make the vehicle 101 uncontrollable by even highly experienced and skilled operators, which in turn could cause extreme danger to the road going public. Accordingly, it is common practice for a novice driver to overload the vehicle 101 and it is not uncommon for even experienced drivers to place a load 103 in the wrong location, exceeding the maximum capacity of some components of the vehicle 101 and/or trailer 105.

Although great strides have been made in the area of towing trailers, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 5 is a simplified schematic of the communication system of FIG. 2.

Figure 1:
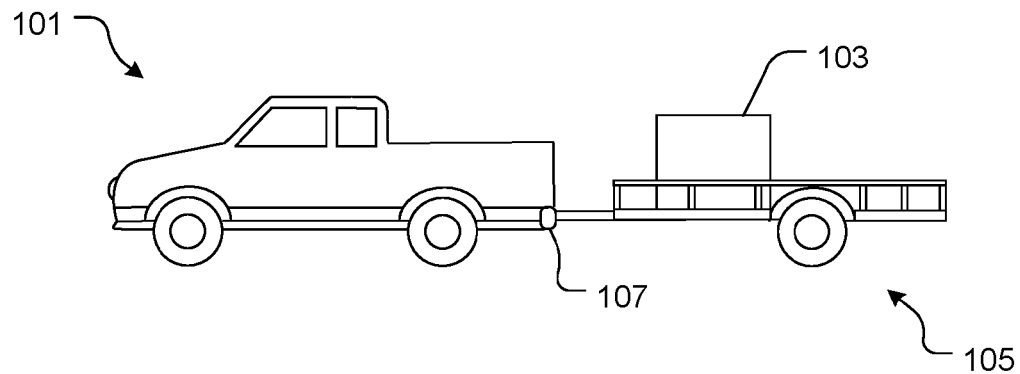
FIG. 1 is side view of a conventional hauling towing system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
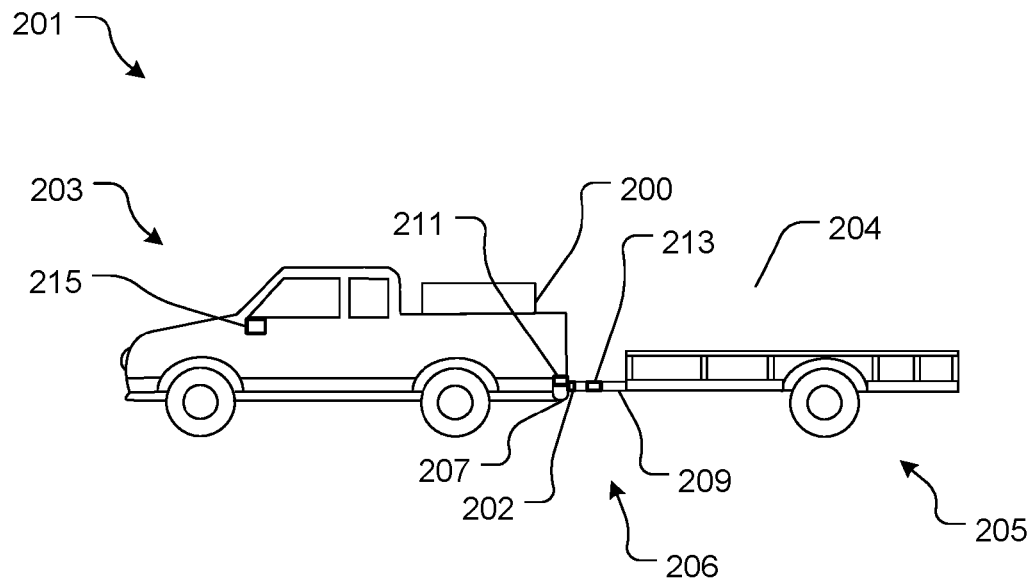
FIG. 2 is a side view of a hauling towing system in accordance with a preferred embodiment of the present application.

Referring now to the drawings wherein like reference characters identify corresponding or similar elements throughout the several views, FIG. 2 depicts a side view of a hauling towing system 201 in accordance with a preferred embodiment of the present application. It will be appreciated that system 201 overcomes one or more of the above-listed problems commonly associated with the conventional hauling towing systems discussed above.

In the contemplated embodiment, system 201 includes a vehicle 203 adapted to carry a load 200 and/or tow a load 204 via a trailer 205. The towing feature is achieved via a hitch assembly 206 that includes a hitch 202 adapted to extend from the receiver on the rear of the towing vehicle to the hitch ball which in turn engages the coupler on the leading edge of trailers neck.

In one embodiment, a hitch ball is secured to the bumper 207 of the vehicle 203; however, it will be appreciated that the features of system 201 discussed herein could be associated with other fastening devices in lieu of hitch ball for towing. In addition, although discussed as being associated with a bumper, the features of system 201 could be associated with other components of the vehicle and/or trailer.

One of the unique features believed characteristic of the present application is the use of a notification system 211, which is preferably secured to the bumper frame and/or a notification system 213 secured to the trailer neck 209. Although depicted as being secured to the bumper frame and/or trailer neck, it will be appreciated that system 211 and/or system 213 could be placed in other locations on vehicle 203 and or trailer 205.

During use, the system 211 and/or system 213 configured to communicate with a device 215 preferably secured within the cab of the vehicle and in viewing and/or hearing access to the driver, as well as simultaneously being adapted to communicate with a handheld device, e. g., a smartphone, that is carried by the driver inside or outside the vehicle. As more fully discussed below, the system 211 and/or system 213 is adapted to notify the driver and/or third party of the weight and location of load 200 and/or 204 in real-time.

Figure 3:
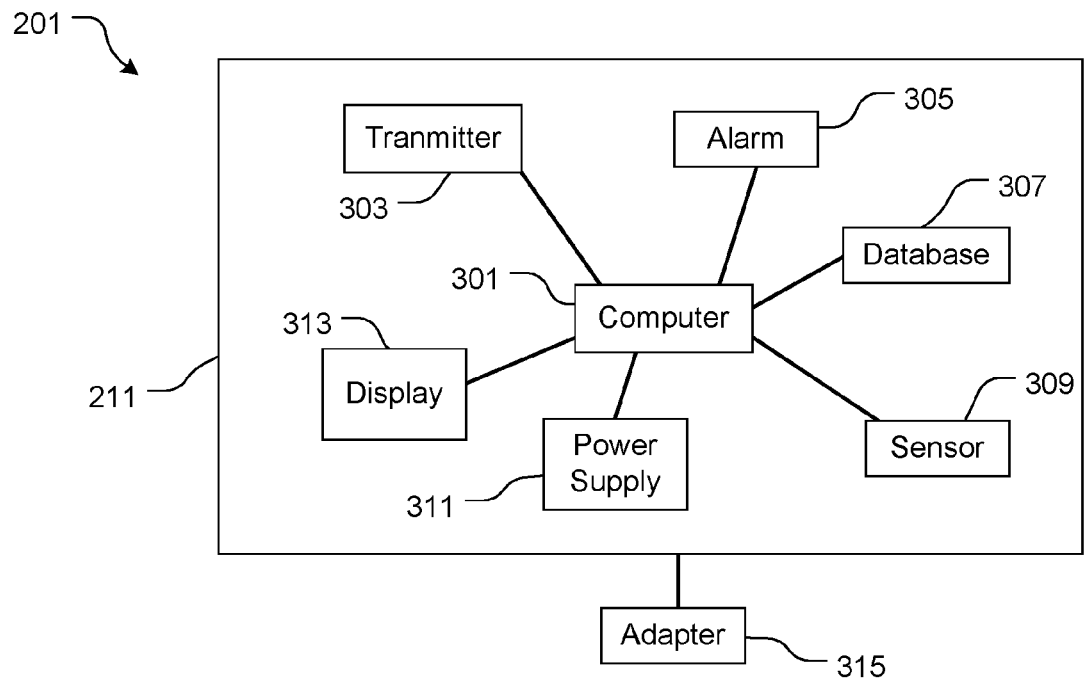
FIG. 3 is a simplified schematic of the notification system of FIG. 2.
Figure 4:
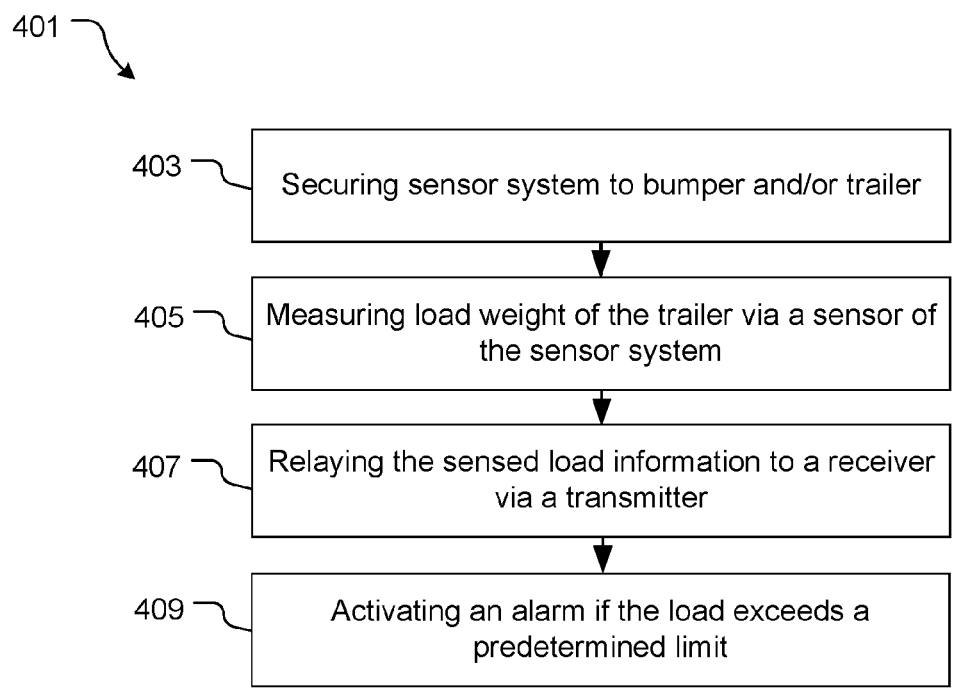
FIG. 4 is a flowchart depicting the preferred method of use.

Referring now to FIG. 3, a simplified schematic of system 211 is shown. It will be appreciated that the system 213 incorporates the features of system 211, although not shown. Notification system 211 preferably includes one or more of a computer 301 operably associated with a transmitter 303, an alarm 305, an internal database 307, a sensor 309, a power supply 311, and a display 313. In one contemplated embodiment, system 201 is provided with an adapter 315 configured to engage with the components of system 211 and configured to secure the components to the vehicle and/or trailer.

During operation, the sensor 309 is configured to determine forces exerted on the trailer and the rear components of the vehicle by the load during travel such as acceleration, deceleration, velocity, weight, and so forth, and is configured to relay the data to the computer in real-time. The computer then stores the data in an optional internal database, e.g., a SD card, and transmits the data to device 215 and/or to a mobile device 503, as shown in FIG. 5. The transmitted data includes the measured information obtained from sensor 309. The computer 301 can do data analysis and could also display the data via a display 313. Another optional feature is providing a visual and/or audible alarm via alarm 305 if a threshold weight limit is reached or particular force of interest is exceeded at any time. Another optional feature is providing for visual and/or audible, and or/tactile alarm 305 is a target value set by the user is met.

Accordingly, the features of system 201 allows the user to receive notice as measured or calculated values change and/or a predetermined weight or force threshold is met. These features are discussed in flowchart 401, wherein the first step includes securing the sensor to the bumper of the vehicle and/or trailer, as depicted in box 403. During operation, the sensor is configured to measure the load weight and location and to relay the sensed information to a receiver, e.g., devices 215, 503, as depicted in boxes 405, 407 to do data analysis and/or calculation. An optional feature is providing notice via an alarm system, as depicted in box 409.

It is also contemplated having a communication system 501 operably associated with system 211 to provide notice to the user 505 via mobile device 503, e.g., a smartphone and/or device 215. The system 211 could also communicate wirelessly to an external server 507 and/or an external database 509. The recording and storing of information allows a third party, e.g., an insurance company, or warranty provider, to determine if the weight limit of load 204 exceeded the threshold for insurance or other liability accountability.

It is also contemplated that additional sensors or data derived from the vehicle's performance and/or motion could be sent to the computer 301 and used in its calculations, thresholds, or outputs that serve to manage the forces of the vehicle and load during use.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system, comprising:
 a vehicle, having:
  a rear bumper; and
  a trailer hitch assembly having a hitch trailer ball;
 a trailer, having:
  a tongue adapted to engage with the hitch trailer ball; and
  a platform configured to carry a load; and
 a monitoring system, having:
  a computer;
  an external server in wireless communication with the computer, the external server having a database configured to record data associated with the monitoring system and receive vehicle performance data to provide an output relating to a correlation between vehicle performance and load weight;
  a sensor operably associated with the computer and configured to measure a weight of the load carried by the trailer;
  a device mounted within an interior of the vehicle, separate from the computer and in wireless communication with the computer via a transmitter, the device having a display configured to relay the data associated with the monitoring system, the device further having;
  an alarm configured to notify a user as a predetermined weight threshold is reached.

2. The system of claim 1, wherein the vehicle is a truck having a flatbed; and
 wherein a second load is carried within the flatbed.

3. The system of claim 2, wherein the monitoring system is configured to measure the second load carried within the flatbed.

4. The system of claim 1, wherein the hitch trailer ball is secured to the rear bumper of the vehicle.

5. The system of claim 1, wherein the sensor is secured to the rear bumper of the vehicle.

6. The system of claim 1, wherein the sensor is secured to the tongue of the trailer.

7. The system of claim 1, wherein the device is a phone.

8. A method to measure a load weight hauled by a vehicle, comprising:
 providing the system of claim 1;
 measuring a load weight of the load carried by the trailer; and
 notifying a driver of the load weight.

9. The method of claim 8, further comprising:
transmitting the measured load weight to the device.

10. The method of claim 8, further comprising:
storing the measured load weight in the database.

11. The method of claim 8, wherein the notifying the driver of the load weight is achieved via an audible noise.

12. The method of claim 8, further comprising:
notifying a third party if a predetermined measure weight threshold is exceeded.

13. A load weight monitoring system for a vehicle, comprising:
a computer;
an external server in wireless communication with the computer, the external server having a database configured to record data associated with the load weight monitoring system and receive vehicle performance data to provide an output relating to a correlation between vehicle performance and load weight;
a sensor operably associated with the computer and configured to measure a weight of the load carried by the vehicle;
a device mounted within an interior of the vehicle, separate from the computer and in wireless communication with the computer via a transmitter, the device having a display configured to relay the data associated with the monitoring system, the device further having;
an alarm configured to notify a user as a predetermined weight threshold is reached.

14. The system of claim 13, wherein the device is a phone.

* * * * *